United States Patent [19]

Rosenberger

[11] Patent Number: 5,158,010
[45] Date of Patent: Oct. 27, 1992

[54] PORTIONING DEVICE FOR PARALLELPIPEDIC SLABS OF DEEP-FROZEN FOODSTUFFS, MORE PARTICULARLY FISH

[75] Inventor: Jörg Rosenberger, Haltern-Flaesheim, Fed. Rep. of Germany

[73] Assignee: Heinz Nienstedt Maschinefabrik GmbH, Haltern, Fed. Rep. of Germany

[21] Appl. No.: 672,182

[22] Filed: Mar. 20, 1991

[30] Foreign Application Priority Data

Mar. 30, 1990 [DE] Fed. Rep. of Germany ....... 4010199

[51] Int. Cl.⁵ .................. A22C 17/00; A22C 25/00; A22C 25/18; A23L 3/36
[52] U.S. Cl. .................... 99/483; 83/171; 99/470; 99/477; 99/517; 99/537
[58] Field of Search ............ 99/453, 467, 477, 483, 99/484, 485, 516, 517, 537, 538, 470; 83/171; 452/148

[56] References Cited

U.S. PATENT DOCUMENTS

| | | |
|---|---|---|
| 3,044,510 | 7/1962 | Schneider et al. ............ 99/537 X |
| 3,196,917 | 7/1965 | Frank . |
| 3,414,982 | 12/1968 | Oas ............................... 99/483 |
| 3,604,334 | 9/1971 | Ballentine ..................... 99/483 |
| 3,924,012 | 12/1975 | Marshall et al. ............. 99/537 X |
| 4,026,201 | 5/1977 | Fetzer .......................... 99/355 |
| 5,048,405 | 9/1991 | Takahashi et al. ............ 99/517 |

FOREIGN PATENT DOCUMENTS

| | | |
|---|---|---|
| 0362461 | 3/1989 | European Pat. Off. . |
| 2428612 | 1/1976 | Fed. Rep. of Germany . |
| 2631851 | 1/1978 | Fed. Rep. of Germany . |
| 3512488 | 7/1986 | Fed. Rep. of Germany . |
| 45-32232 | 10/1970 | Japan ............................ 99/537 |
| 257286 | 4/1970 | U.S.S.R. ....................... 99/517 |
| 0623541 | 8/1978 | U.S.S.R. ....................... 99/517 |
| 949495 | 2/1964 | United Kingdom . |
| 2191969 | 12/1987 | United Kingdom . |

Primary Examiner—Timothy F. Simone
Attorney, Agent, or Firm—Marmorek, Guttman & Rubenstein

[57] ABSTRACT

The invention relates to a portioning device for deep-frozen foodstuffs, more particularly fish. The portioning device is adapted to the portioning of parallelpipedic slabs (3). The slabs (3) are fed lying flat in the transverse position via a conveying path (6) to a drum (2) which is disposed above the conveying path (6) and whose generated surface (10) is equipped with heated separating webs (11, 12). The heated separating webs (11, 12) of the drum (2), which is driven in synchronism with the feed, subdivide the slab (3) in synchronism into individual portions (4,5). The shape of the portions (4,5) depends on the arrangement of the separating webs (11,12) on the drum generated surface (10). The subdivision of the slabs (3) into individual portions (4,5) is performed free from cutting losses, since the heated separating webs (11,12) soften up the deep-frozen foodstuffs at the cutting place.

5 Claims, 2 Drawing Sheets

PORTIONING DEVICE FOR PARALLELPIPEDIC SLABS OF DEEP-FROZEN FOODSTUFFS, MORE PARTICULARLY FISH

BACKGROUND OF THE INVENTION

The foodstuffs industry makes available to consumers deep-frozen foodstuffs, more particularly fish, in small portions, for example in the shape of, small rods, trapeziums or similar shapes. To obtain portions of trapezoidal shape, in practice three different possible methods are used:

1. Two rods with complementary cross-sections having the trapezoidal shape of the portions are brought together and the portions are cut therefrom in slices.
2. Parallelipipedic slices twice the size of the required portions are brought together in a stack and parted jointly substantially diagonally.
3. Slabs are divided into slices twice the size of the portions, and then these parallelipipedic slices are punched through substantially diagonally. All these methods are expensive and involve cutting losses.

SUMMARY OF THE INVENTION

It is an object of the invention to provide a portioning device by means of which portions of different shapes can be produced without cutting losses. This problem is solved by a portioning device for parallelipipedic slabs of deep-frozen foodstuffs, more particularly fish, which is characterized by the following features:

a) A conveying table has a feed path having lateral guide stops for the slabs to be conveyed lying flat transversely of the feed direction, and entraining members which act on the rear edges of the slabs in the feed direction.

b) Disposed above the conveying path is a driven drum which runs synchronously with the entraining members in the feed direction and whose generated surface is equipped with heating separating webs extending close to the top side of the conveying path.

c) In the zone of the drum the conveying path takes the form of a perforate plate, through whose perforation a blowing agent is blown.

In the portioning device according to the invention a start is made from slabs, not from slabs divided into slices. The slabs are parted into the portions of required shape in one operation by the heated separating webs without cutting losses Since on their undersides remote from the separating webs the slabs are acted upon by the blowing agent blown through the perforation, the blowing agent acts like a lubricating film between the conveying path and the slabs, so that the slabs are not decelerated, in spite of the pressure exerted on them by the separating webs in the direction of the conveying path. Moreover, the parting process is boosted, without the separating webs having to approach dangerously near to the top side of the conveying path. While in separating with saws cutting losses occur due to the removal of material, and punching separation causes losses by crumbling, due to the heated separating webs in the portioning device according to the invention no cutting losses occur, since the separating webs soften up the deep-frozen foodstuff at the required separating place, so that it can be divided free from losses. The portions softened up at the separating joints are as a rule refrozen by the cold content of the portions. This operation can be further boosted by the feature that disposed immediately downstream of the drum are blowing nozzles by which a gaseous cooling agent is blown on to the slabs divided into portions.

The separating webs can be very simply heated by the feature that for the heating of the separating webs upstream of the drum, blowing nozzles are provided by which hot blowing air is blown on to the separating webs.

The shape of the separating webs depends on the required shape of the portions. Preferably the separating webs take the form of annular discs which lie in planes perpendicularly to the drum axis. With a portioning device constructed only as disclosed hereinbefore, parallelipipedic portions are obtained Parallelogram-shaped portions are obtained if the separating webs are constructed arcuately and extend at an angle over the drum generated surface. If both forms of separating webs are combined,

BRIEF DESCRIPTION OF THE DRAWINGS

An embodiment of the invention will now be explained in greater detail with reference to the drawings, wherein.

DETAILED DESCRIPTION OF PREFERRED EMBODIMENT

Figure 1:
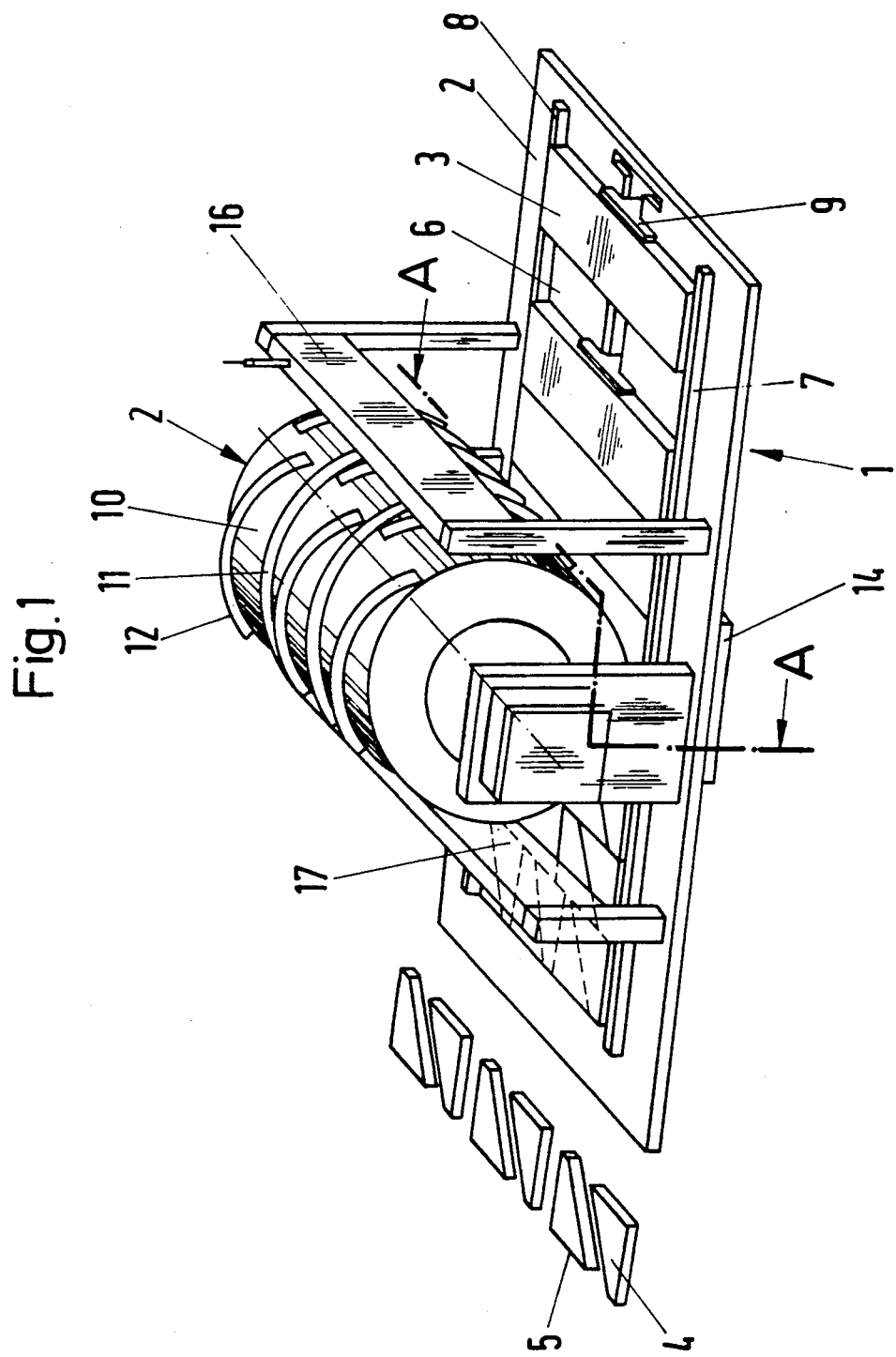
FIG. 1 is a perspective view of a portioning device.
Figure 2:
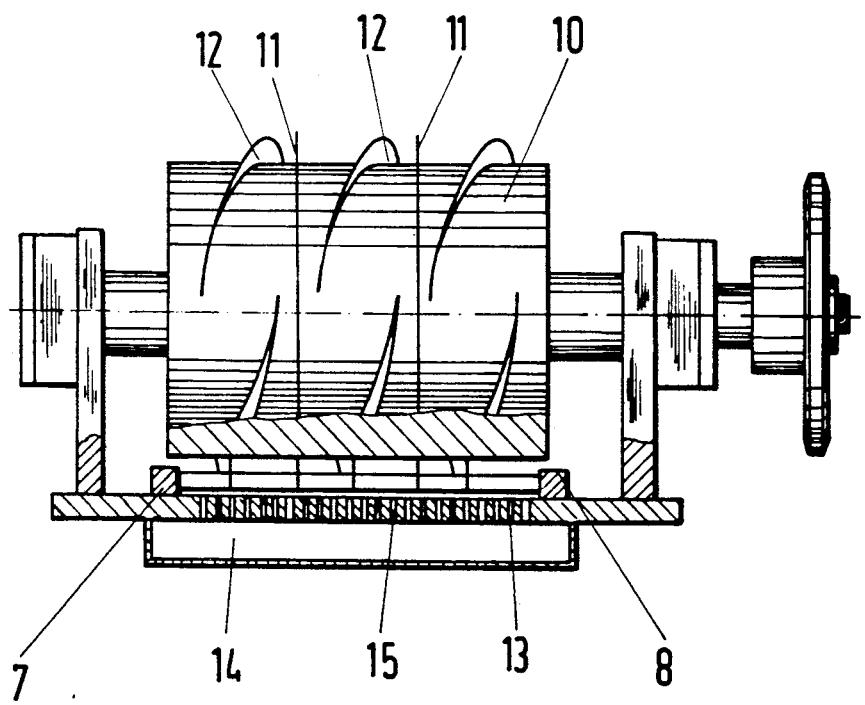
FIG. 2 shows the portioning device illustrated in FIG. 1, partly in front elevation and partly axially sectioned along the line A—A in FIG. 1.

A portioning device for parallelipipedic slabs 3 of deep-frozen fish comprises a conveying table 1 and a drum 2 disposed thereabove for separating parallelipipedic slabs 3 into small trapezoidal portions 4, 5.

The conveying table 1 has a conveying path 6, for the slabs 3 to be conveyed lying flat and in the transverse position, having lateral guide stops 7, 8 and entraining members 9 engaging with the rear edges of the slabs 3. The entraining members 9 remove the slabs 3, for example, from a magazine (not shown), in which they are stacked one above the other, and push them together so that they are disposed one against the other without gaps in the zone of the drum 2. The generated surface 10 of the drum 2 is equipped with different separating webs 11, 12. The separating webs 11 take the form of annular discs and are disposed in planes perpendicular to the drum axis, while the separating webs 12 are arcuate and disposed at an angle to the drum axis. In the peripheral direction of the drum 2 the arcuate separating webs 12 have a length corresponding to the length of the slabs 3, viewed in the feed direction. The drum 2 is driven and so synchronized with the entraining members 9 that the start and end of the arcuate separating webs 12 coincide with the front and rear edges of the slabs 3 during conveying.

The conveying path 6 is constructed smooth. In the zone of the path 6 which is opposite to the drum 2, the path 6 is constructed in the form of a perforate plate 13 and has on its underside a blowing box 14, from which air can be blown via the perforate plate 13 between the underside of the slabs 3 to be separated and the top side of the conveying path 6. The blown-in air acts as a lubricating film 15 in the zone of the drum 2. The lubricating film 15 prevents the slabs 3 from being subjected, due to the pressure exerted on the slabs by the separating webs 11, 12 against the conveying path 6, to frictional forces impeding further conveying. The lubricating film 15 also ensures that the slightly raised slabs 3 to be parted are completely parted without the necessity of the separating webs 11, 12 being disposed with their tops in dangerous contact vicinity of the conveying path 6.

Disposed upstream of the drum 2 in the conveying direction is a heating device 16 taking the form of a blowing box having a plurality of blowing nozzles (not shown). Hot air is blown via the blowing nozzles on the separating webs 11, 12, so that they become heated. Disposed downstream of the drum 2 in the conveying direction is a similar blowing box 17 which via blowing nozzles (not shown) blows a gaseous coolant on to the separated slabs, to boost the refreezing of the fish softened up at the separating joints.

I claim:

1. A portioning device for dividing parallelipipedic slabs of a frozen food into smaller portions, comprising:
   a conveying table,
   lateral guide stops disposed on a topside of said conveying table, said lateral guide steps defining a feed path on said conveying table for said slabs,
   entraining means for moving said slabs along said feed path,
   a rotatable drum disposed above said conveying table, said drum being driven in synchronization with movement of said entraining means,
   said drum having an outer generated surface from which heated separating webs extend, said separating webs being of sufficient height so as to extend close to said topside of said conveying table, and
   said conveying table including a perforating plate in a zone opposite to said drum, a blowing agent being blown through said perforated plate to help support said slabs as they enter said zone.

2. The portioning device of claim 1 further comprising coolant blowing means disposed immediately downstream of said drum for blowing a gaseous cooling agent onto said slabs which have been divided into said smaller portions.

3. The portioning device of claim 1 or 2 further comprising heat blowing means disposed immediately upstream of said drum for blowing hot air onto said separating webs.

4. The portioning device of claim 1 wherein said separating webs comprise annular discs which lie in planes perpendicular to an axis of said drum.

5. The portioning device of claim 1 wherein said separating webs are arcuately shaped and extend at an angle over said outer generated surface of said drum.

* * * * *